(12) United States Patent
Suzuki

(10) Patent No.: US 11,873,909 B2
(45) Date of Patent: Jan. 16, 2024

(54) VALVE DEVICE

(71) Applicant: DENSO CORPORATION, Kariya (JP)

(72) Inventor: Rie Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/735,441

(22) Filed: May 3, 2022

(65) Prior Publication Data

US 2022/0260163 A1    Aug. 18, 2022

Related U.S. Application Data

(63) Continuation of application No. PCT/JP2020/038309, filed on Oct. 9, 2020.

(30) Foreign Application Priority Data

Nov. 7, 2019  (JP) ................................. 2019-202524

(51) Int. Cl.
| | |
|---|---|
| *F16K 11/085* | (2006.01) |
| *F16K 27/06* | (2006.01) |
| *F16K 5/06* | (2006.01) |
| *F16K 3/26* | (2006.01) |
| *F16K 27/04* | (2006.01) |
| *F16K 11/087* | (2006.01) |
| *F16K 5/20* | (2006.01) |

(52) U.S. Cl.
CPC ........ *F16K 11/0856* (2013.01); *F16K 27/065* (2013.01); *F16K 27/067* (2013.01); *F16K 3/26* (2013.01); *F16K 5/06* (2013.01); *F16K 5/20* (2013.01); *F16K 11/087* (2013.01); *F16K 27/04* (2013.01)

(58) Field of Classification Search
CPC .. F16K 11/0856; F16K 11/087; F16K 27/065; F16K 27/067; F16K 27/04; F16K 3/26; F16K 5/06; F16K 5/20
See application file for complete search history.

(56) References Cited

U.S. PATENT DOCUMENTS

| | | | | |
|---|---|---|---|---|
| 4,506,864 | A * | 3/1985 | Hartmann | ............... F16K 5/201 |
| | | | | 277/377 |
| 4,676,480 | A * | 6/1987 | Garceau | ................ F16K 5/0647 |
| | | | | 251/174 |
| 9,670,825 | B2 * | 6/2017 | Murakami | ................ F01P 3/20 |
| 9,835,259 | B2 * | 12/2017 | Shah | ..................... F16K 5/0636 |
| 9,897,217 | B2 * | 2/2018 | Greene | ................... F16K 5/201 |
| 10,865,888 | B2 * | 12/2020 | Grosskopf | ............. F16K 5/201 |

(Continued)

*Primary Examiner* — Matthew W Jellett
*Assistant Examiner* — Christopher D Ballman
(74) *Attorney, Agent, or Firm* — Nixon & Vanderhye P.C.

(57) ABSTRACT

A valve device includes a case member, a valve body, a sleeve, a spring, and a spring end support part. The sleeve is slidably supported by an inner wall of a fluid inflow part of the case member and forms a flow path to guide a fluid flowing out from a valve outflow port of the valve body toward a fluid outflow port of the case member. The spring is placed so as to surround the outer periphery of the sleeve and biases the sleeve toward the valve body. The spring end support part is formed in an end part in the case member on an opposite side of the spring from the valve body and supports an end part of the spring on an opposite side to the valve body in the axial direction from the outside in the radial direction of the spring.

11 Claims, 8 Drawing Sheets

(56) References Cited

U.S. PATENT DOCUMENTS

| | | | |
|---|---|---|---|
| 10,975,975 B2* | 4/2021 | Sato | F16K 11/076 |
| 11,079,028 B2* | 8/2021 | Hashimoto | F16K 11/0873 |
| 11,371,416 B2* | 6/2022 | Hashimoto | F16K 5/201 |
| 11,378,191 B2* | 7/2022 | Wang | F16K 5/12 |
| 2015/0027572 A1* | 1/2015 | Morein | F16K 41/026 |
| | | | 137/594 |
| 2015/0361865 A1* | 12/2015 | Lee | F01P 7/14 |
| | | | 123/41.08 |
| 2016/0281585 A1 | 9/2016 | Muizelaar et al. | |
| 2017/0009894 A1 | 1/2017 | Seko et al. | |
| 2018/0149073 A1 | 5/2018 | Shen et al. | |
| 2018/0340618 A1 | 11/2018 | Seko et al. | |
| 2019/0186641 A1 | 6/2019 | Seko et al. | |
| 2019/0249786 A1 | 8/2019 | Bell | |

* cited by examiner

VALVE DEVICE

CROSS REFERENCE TO RELATED APPLICATION

The present application is a continuation application of International Patent Application No. PCT/JP2020/038309 filed on Oct. 9, 2020, which designated the U.S. and claims the benefit of priority from Japanese Patent Application No. 2019-202524 filed on Nov. 7, 2019. The entire disclosures of all of the above applications are incorporated herein by reference.

TECHNICAL FIELD

The present disclosure relates to a valve device.

BACKGROUND

Conventionally, a valve device including a housing and a valve body, which is rotational in the housing is known.

SUMMARY

According to one aspect of the present disclosure, a valve device is configured to perform at least one of adjustment of a flow rate of fluid or switching of a flow path. The valve device comprises a case member and a valve body rotational in the case member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
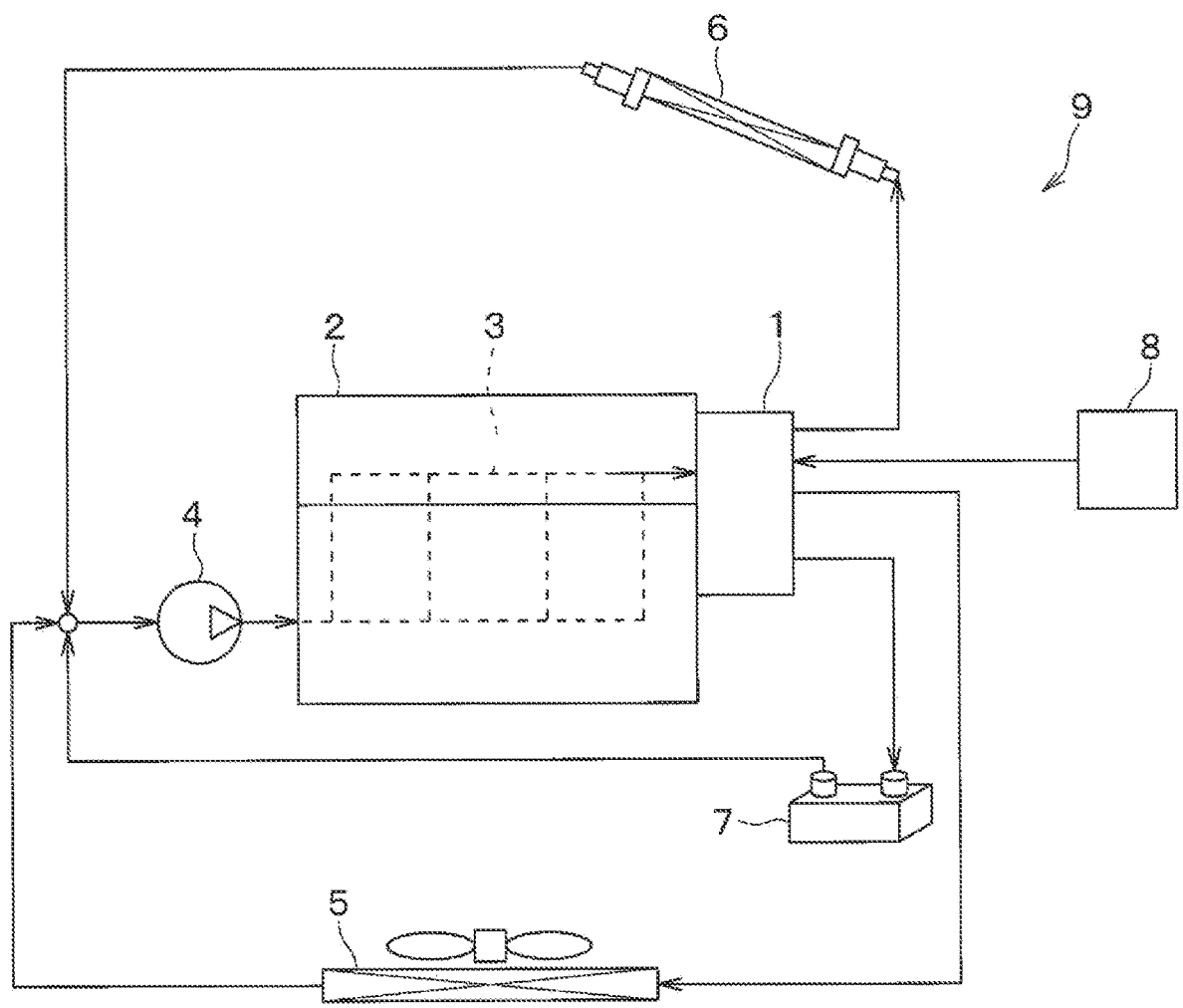
FIG. 1 is a general configuration diagram of a cooling system in which cooling water of an engine mounted in a vehicle circulates.

Hereinafter, examples of the present disclosure will be described.

According to an example, a valve device includes a housing provided with an inlet in which cooling water is introduced and an outlet from which the cooling water is discharged, and a rotatably supported valve having a valve opening to which the cooling water supplied from the inlet flows. The device includes a valve sheet having a sheet opening to which the cooling water passed through the valve opening flows, a cylindrical-shaped sleeve guiding the cooling water which passed through the sheet opening to the outlet, and a spring attached to the periphery of the sleeve and biasing the valve sheet against the surface of the valve.

In an assumable configuration, the spring may be simply placed so as to surround the periphery of the sleeve, an axial shift of the spring occurs easily. Consequently, the spring may come into contact with the outer periphery of the sleeve due to vibration or the like from the outside, and the spring and the sleeve may be subject to abrasion. When the abrasion of the spring and the sleeve continues in such a manner, there is a concern that the spring force of the spring which presses the valve sheet against the surface of the valve decreases, and leakage of the cooling water increases.

According to an example of the present disclosure, a valve device is configured to perform at least one of adjustment of a flow rate of fluid or switching of a flow path. The valve device comprises a case member having a fluid inlet part configured to cause fluid to flow therethrough, a fluid inflow part configured to cause the fluid, which flows into the fluid inlet part, to flow therethrough, and a fluid outflow port configured to cause the fluid, which passes through the fluid inflow part, to flow therefrom. The valve device further comprises a valve body having a valve outflow port configured to cause the fluid, which flows from the fluid inlet part, to flow therethrough and is rotational inside the case member. The valve device further comprises a cylindrical sleeve slidably supported by an inner wall of the fluid inflow part and forming a flow path configured to guide the fluid, which flows from the valve outflow port, to the fluid outflow port of the case member. The valve device further comprises a spring surrounding an outer periphery of the sleeve and biasing the sleeve toward the valve body. The valve device further comprises a spring end support part formed on an end part in the case member, which is on an opposite side of the spring from the valve body. The spring end support part is configured to support an end part of the spring on a side opposite to the valve body in an axial direction and from an outside in a radial direction of the spring.

With such a configuration, by the spring end support part formed in the end part on the side opposite to the valve body side of the spring in the case member, the end part on the side opposite to the valve body side in the axial direction of the spring is supported. Therefore, an axial shaft of the spring is prevented, and the abrasion between the spring and the sleeve can be suppressed.

Hereinafter, embodiments of the present disclosure will be described with reference to the drawings. In the following embodiments, the same reference numeral is assigned to parts which are the same or equivalent to each other and its description will not be repeated.

First Embodiment

A valve device according to a first embodiment will be described with reference to the drawings. A valve device 1 of the embodiment is for use in a cooling water circuit of an engine mounted in a vehicle. As illustrated in FIG. 1, the valve device 1 is applied to a cooling system 9 of a vehicle.

In the vehicle, an engine 2 as an internal combustion engine, a cooling system 9, a heater 6, a device 7, and the like are mounted.

The cooling system 9 has the valve device 1, a water pump 4, a radiator 5, an ECU 8, and the like. The water pump 4 pressure-feeds cooling water toward a water jacket 3 of the engine 2. The valve device 1 is provided, for example, at the exit of the water jacket 3 of the engine 2 and adjusts the flow rate of the cooling water which is fed to the radiator 5, the heater 6, and the device 7.

The radiator 5 is a heat exchanger and performs heat exchange between the cooling water and air to decrease the temperature of the cooling water. The heater 6 and the device 7 are provided between the valve device 1 and the water pump 4. The device 7 includes, for example, an oil cooler, an EGR cooler and the like.

The heater 6 heats the air in the compartment of the vehicle by heat exchange between the cooling water and the air in the compartment of the vehicle. When cooling water is flowed to the device 7, heat exchange is performed between fluid (for example, oil, EGR gas, or the like) flowing in the device 7 and the cooling water. The ECU 8 controls the operation of the valve device 1 and can control the flow rate of the cooling water fed to the radiator 5, the heater 6, and the device 7.

The valve device 1 can perform adjustment of the flow rate of the cooling water as the fluid circulating in the cooling water circuit and switching of the flow path. As the cooling water, for example, LLC (Long Life Coolant) including ethylene glycol or the like is used.

Figure 2:
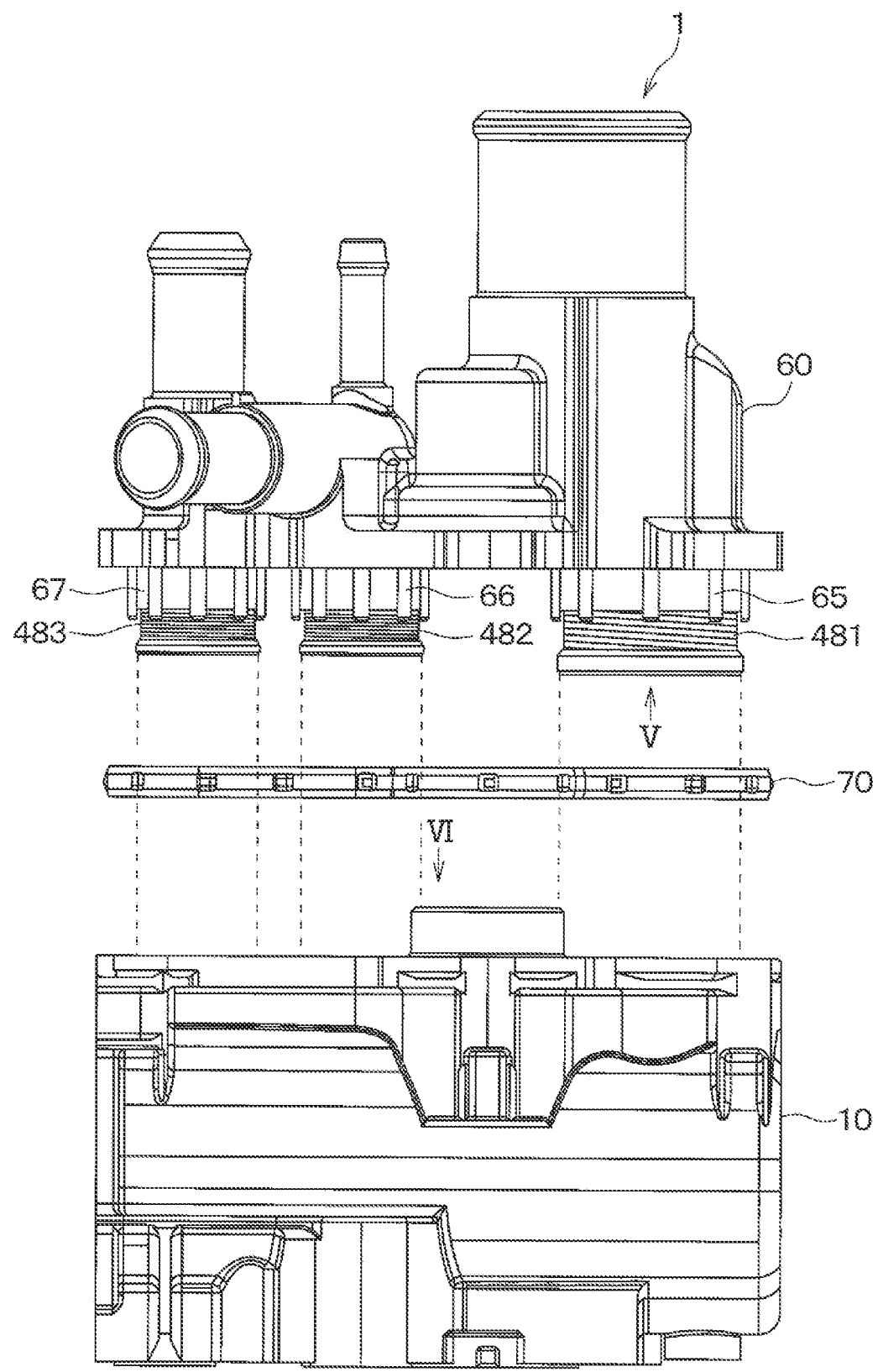
FIG. 2 is an exploded view of a valve device according to a first embodiment.

As illustrated in FIG. 2, the valve device 1 of the embodiment has a housing 10, an outlet pipe structural member 60, and a gasket 70 sealing a valve body 30 and the outlet pipe structural member 60. In the outlet pipe structural member 60, a plurality of projections 65 to 67 are formed. Each of the housing 10 and the outlet pipe structural member 60 is made of resin, and the gasket 70 is made by an elastic member. The housing 10 and the outlet pipe structural member 60 form an outer shell of the valve device 1. The housing 10, the outlet pipe structural member 60, and the gasket 70 are fixed and integrated by a tapping screw which will be described later.

Figure 3:
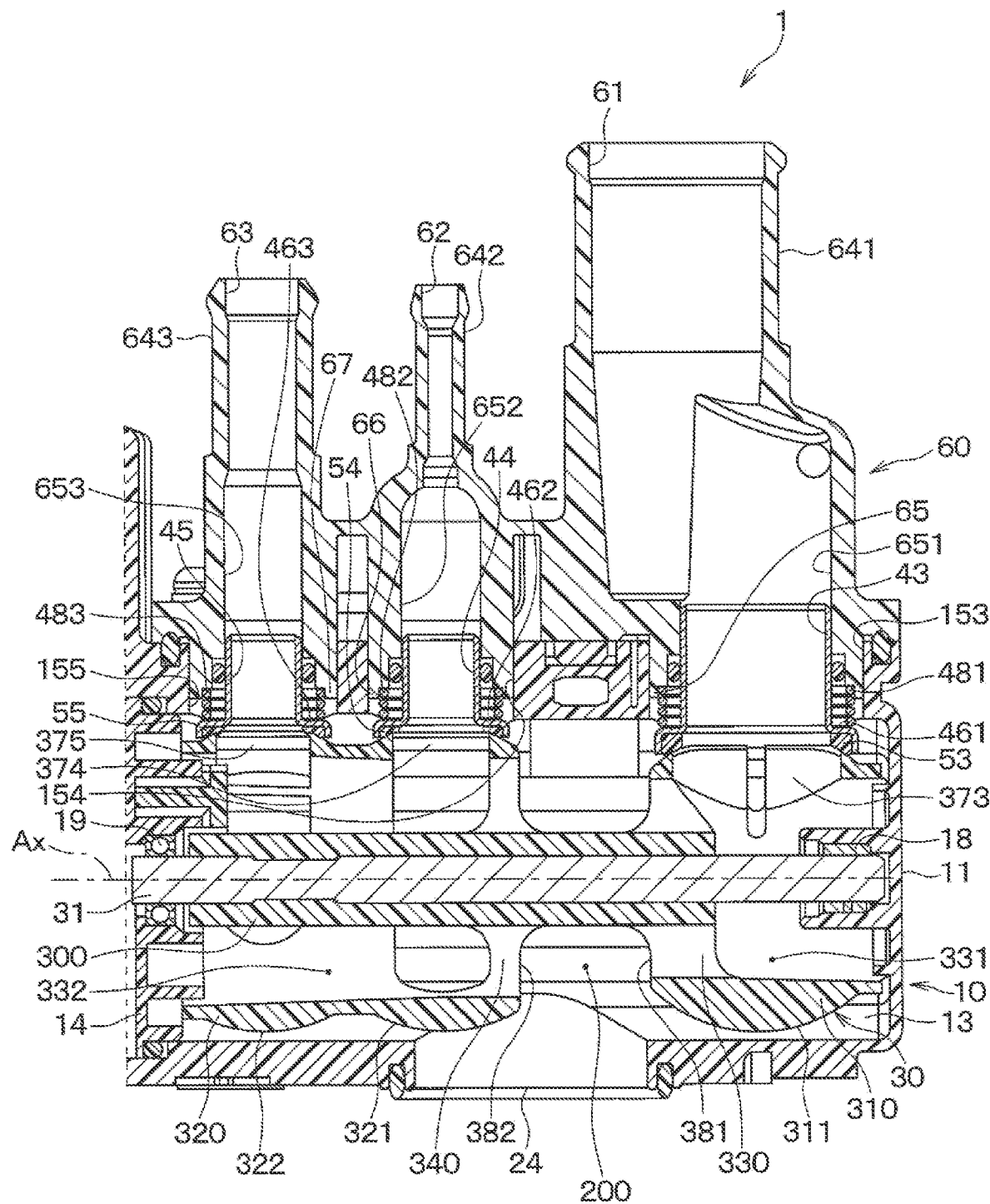
FIG. 3 is a cross section of the valve device according to the first embodiment.

As illustrated in FIG. 3, the housing 10 has a housing body 11 configuring a part of the outer shell of the valve device 1, a first bearing 18 supporting a shaft 31, a plate 14, and the like. On the inside of the housing body 11, a housing space 13 in which the shaft 31, the valve body 30, and the like are housed is formed. In the housing body 11, a fluid inlet part 24 for making the cooling water flow into the housing space 13 and first to third fluid outlet parts 153, 154, and 155 for making the cooling water flow out from the housing space 13 to the outlet pipe structural member 60 are formed. The plate 14 is provided with a second bearing 19.

The shaft 31 is rotatably supported on the inside of the housing body 11 by the first bearing 18 and the second bearing 19. The shaft 31 rotates about the axis by driving of a not-illustrated electric motor provided on the outside of the housing body 11.

The valve body 30 is fixed to the shaft 31. Consequently, with rotation of the shaft 31, the valve body 30 rotates about the axis of the shaft 31 on the inside of the housing body 11. The axis of the shaft 31 and a rotation axis Ax of the valve body 30 coincide with each other.

The valve body 30 has a shaft fixing part 300, a first cylinder part 310, a second cylinder part 320, a plurality of first coupling parts 330, and a plurality of second coupling parts 340.

The shaft fixing part 300 is fixed to the external wall of the shaft 31. The first cylinder part 310 and the second cylinder part 320 are provided in positions apart from the shaft fixing part 300 to the outside in the radial direction. The first cylinder part 310 is provided on one side in the axial direction of the shaft 31, and the second cylinder part 320 is provided on the other side in the axial direction of the shaft 31. In the following description, in the two cylinder parts, the cylinder part on the right side in the sheet of FIG. 3 will be called the first cylinder part 310, and the cylinder part on the left side in the sheet will be called the second cylinder part 320.

Between the first cylinder part 310 and the second cylinder part 320, a predetermined space 200 is provided. The predetermined space 200 is provided in a position corresponding to the fluid inlet part 24 of the housing body 11. Concretely, the predetermined space 200 between the first cylinder part 310 and the second cylinder part 320 and the fluid inlet part 24 of the housing body 11 are provided so as to overlap at least a part when viewed from a direction perpendicular to the rotation axis Ax of the valve body 30.

In the external wall of the first cylinder part 310, a spherical face 311 is formed. In a part of the spherical face 311, a first valve outflow port 373 from which the cooling water outflows is provided.

The plurality of first coupling parts 330 extend radially between the end part on the second cylinder part 320 side of the first cylindrical part 310 and the shaft fixing part 300 and couple the first cylinder part 310 and the shaft fixing part 300. A first valve inflow port 381 is formed among the plurality of first coupling parts 330.

The first valve inflow port 381 is an inflow port through which the cooling water flows from the space on the inside of the housing body 11 (concretely, the predetermined space 200 between the first cylinder part 310 and the second cylinder part 320) into a space 331 on the inside of the first cylinder part 310 of the valve body 30.

On the other hand, in the external wall of the second cylinder part 320, two spherical surfaces 321 and 322 whose center points are different are formed. A second valve outflow port 374 is formed in the spherical surface 321 as one of the two spherical surfaces 321 and 322 formed in the external wall of the second cylinder 320, and a third valve outflow port 375 is provided in the other spherical surface 322.

The plurality of second coupling parts 340 extend radially between the end part on the first cylinder part 310 side of the second cylinder part 320 and the shaft fixing part 300 and connect the second cylinder part 320 and the shaft fixing part 300. A second valve inflow port 382 is formed among the plurality of second coupling parts 340.

The second valve inflow port 382 is an inflow port through which the cooling water flows from the space on the inside of the housing body 11 (concretely, the predetermined space 200 between the first cylinder part 310 and the second cylinder part 320) into a space 332 on the inside of the second cylinder part 320 of the valve body 30. As described above, in the embodiment, each of the first valve inflow port 381 and the second valve inflow port 382 of the valve body 30 is provided in a region positioned in the rotation axis Ax direction in the valve body 30.

The outlet pipe structural member 60 has first to third fluid inflow parts 651, 652, and 653 in positions corresponding to the first to third valve outflow ports 373, 374, and 375 in the housing body 11, respectively.

The outlet pipe structural member 60 further has first to third fluid outflow ports 61, 62, and 63 to outflow the cooling water from the outlet pipe structural member 60 and first to third pipe connecting parts 641, 642, and 643.

Each of the first to third pipe connecting parts 641, 642, and 643 has a cylindrical shape. To each of the first to third pipe connecting parts 641, 642, and 643, a not-illustrated pipe in which the cooling water flows is connected.

The first fluid outflow port 61 is formed in the first pipe connecting part 641. The second fluid outflow port 62 is formed in the second pipe connecting part 642, and the third fluid outflow port 63 is formed in the third pipe connecting part 643.

In the first to third fluid inflow parts 651, 652, and 653, first to third sleeves 43, 44, and 45, first to third sheet members 53, 54, and 55, and the like are provided, respectively. The first to third sleeves 43, 44, and 45 are slidably supported by the inner walls of the first to third fluid inflow parts 651, 652, and 653 of the outlet pipe structural member 60.

The first to third sleeves 43, 44, and 45 form flow paths in which the cooling water outflows from the space on the inside of the valve body 30 through the first to third valve outflow ports 373, 374, and 375. The first to third sleeves 43, 44, and 45 have first to third flange parts 461, 462, and 463 for supporting the sheet members 53, 54, and 55, respectively, at the end parts on the valve body 30 side. The first to third flange parts 461, 462, and 463 are formed so as to expand from one end on the housing body 11 side of the first to third sleeves 43, 44, and 45 to the outside in the radial direction of the first to third sleeves 43, 44, and 45.

The first sheet member 53 is provided between the flange part 461 of the first sleeve 43 and the external wall of the first cylinder part 310 of the valve body 30. The second and third sheet members 54 and 55 are provided between the second and third flange parts 462 and 463 of the second and third sleeves 44 and 45 and the external wall of the second cylinder part 320 of the valve body 30. Each of the first to third sheet members 53, 54, and 55 is formed annularly and the cooling water flows on the inner diameter side.

The first sheet member 53 is in slide contact with the external wall of the first cylinder part 310 of the valve body 30. The second and third sheet members 54 and 55 are in slide contact with the external wall of the second cylinder part 320 of the valve body 30. Between the first to third flange parts 461, 462, and 463 of the first to third sleeves 43, 44, and 45 and the outlet pipe structural member 60, first to third springs 481, 482, and 483 are provided, respectively. The first to third springs 481, 482, and 483 are compression coil springs and press the first to third sleeves 43, 44, and 45 and the first to third sheet members 53, 54, and 55 to the valve body 30 side. Consequently, the first to third sheet members 53, 54, and 55 are tightly attached to the external wall of a cylinder part 35 of the valve body 30. The first to third sheet members 53, 54, and 55 prevent leakage of the cooling water between space formed between the inner wall of the housing body 11 and the external wall of the valve body 30 and flow paths on the inside of the first to third sleeves 43, 44, and 45.

The cooling water flows from the fluid inlet part 24 of the housing body 11 into the housing space 13 of the housing body 11.

In the case where the first to third valve outflow ports 373, 374, and 375 of the valve body 30 are communicated with the first to third fluid inflow parts 651, 652, and 653 of the outlet pipe structural member 60, the cooling water of the housing space 13 flows as follows. Specifically, the cooling water in the housing space 13 passes through the first valve inflow port 381 and the second valve inflow port 382 of the valve body 30 and flows to the first to third valve outflow ports 373, 374, and 375 of the valve body 30.

The cooling water further passes through the first to third sheet members 53, 54, and 55 and the first to third sleeves 43, 44, and 45 and, after that, outflows from the first to third fluid outflow ports 61, 62, and 63 of the outlet pipe structural member 60.

In the case where the first to third valve outflow ports 373, 374, and 375 of the valve body 30 are not communicated with the first to third fluid inflow parts 651, 652, and 653 of the outlet pipe structural member 60, the cooling water does not flow to the first valve inflow port 381 and the second valve inflow port 382 of the valve body 30 but remains in the housing space 13.

Figure 5:
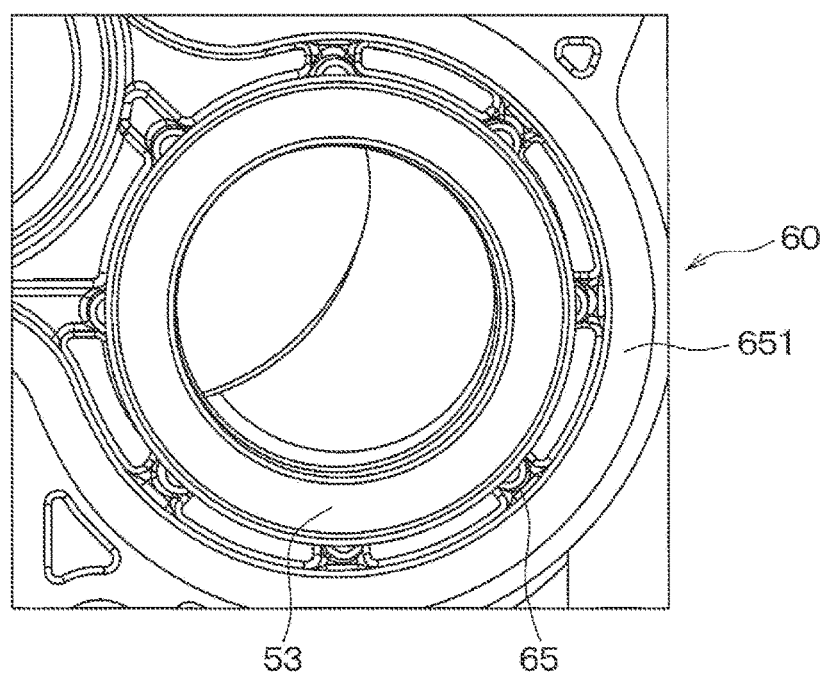
FIG. 5 is a view seen from the V arrow in FIG. 2.
Figure 6:
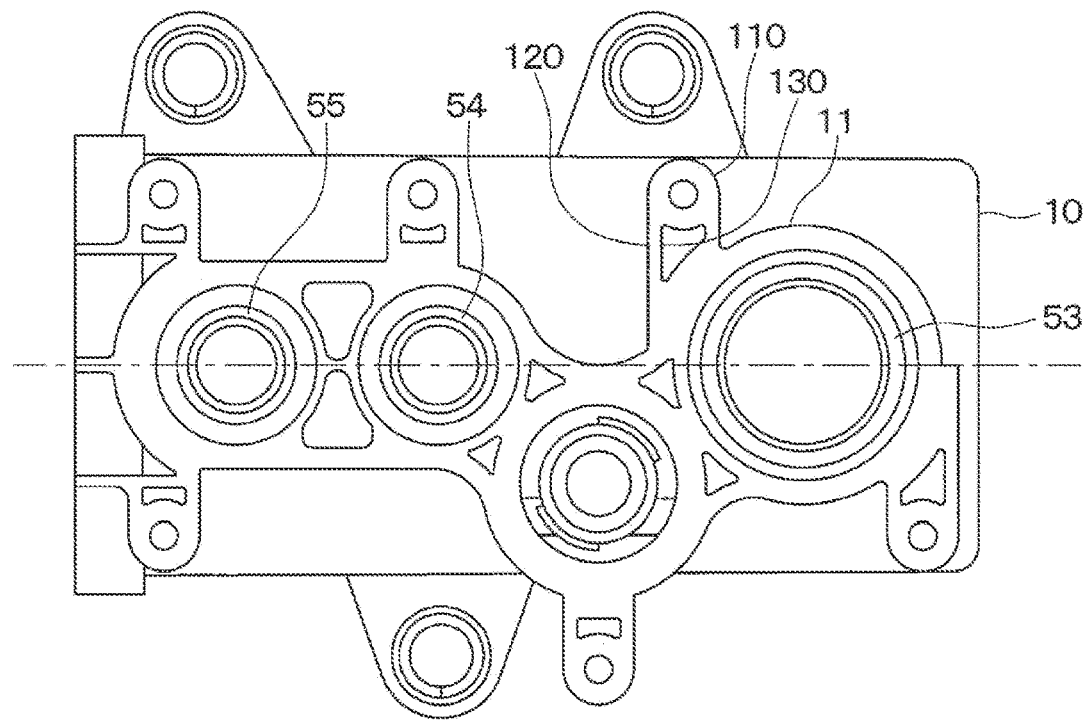
FIG. 6 is a view seen from the VI arrow in FIG. 2.

As illustrated in FIGS. 3 and 5, the valve device 1 has eight first projections 65, eight second projections 66, and eight third projections 67 at end parts on the side opposite to the valve body 30 side of the first to third springs 481, 482, and 483 in the outlet pipe structural member 60, respectively. The first to third projections 65, 66, and 67 correspond to spring end support parts. In other words, the valve device 1 has the first to third projections 65, 66, and 67, as an example of the spring end support parts, in regions on the outside in the radial direction from the end parts on the side opposite to the valve body 30 side of the first to third springs 481, 482, and 483 in the outlet pipe structural member 60.

The eight first projections 65 support the end part on the side opposite to the valve body 30 side of the first spring 481 from the outside in the radial direction of the first spring 481. The eight second projections 66 support the end part on the side opposite to the valve body 30 side of the second spring 482 from the outside in the radial direction of the spring 482. The eight third projections 67 support the end part on the side opposite to the valve body 30 side of the third spring 483 from the outside in the radial direction of the third spring 483.

As illustrated in FIGS. 2 and 3, the first to third projections 65, 66, and 67 project from the end parts on the side opposite to the valve body 30 side of the first to third springs 481, 482, and 483 in the outlet pipe structural member 60 toward the outside in the radial direction of the first to third springs 481, 482, and 483, respectively.

Figure 4:
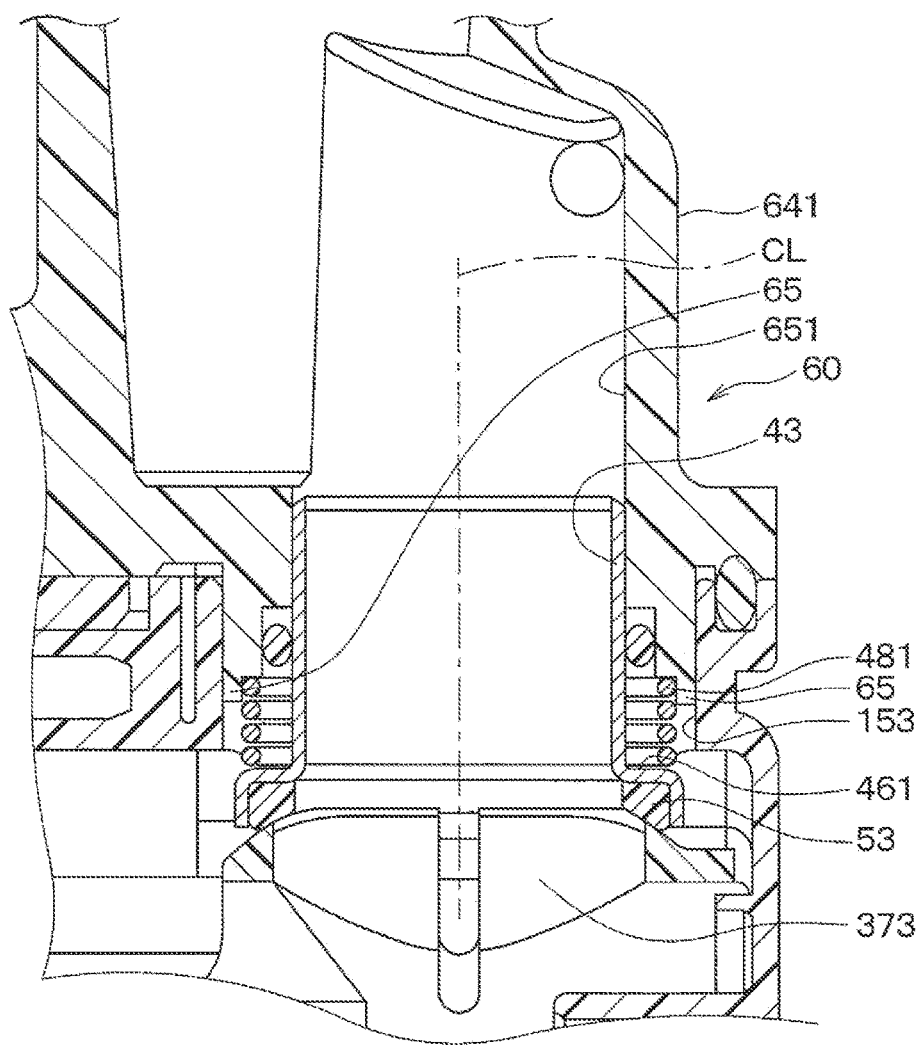
FIG. 4 is a partial enlarged view of FIG. 3.

As illustrated in FIG. 4, the first projection 65 projects from the end part on the side opposite to the valve body 30 side of the first spring 481 in the outlet pipe structural member 60 toward the outside in the radial direction of the first spring 481. In other words, the first projection 65 projects in parallel to an axis line CL of the first fluid inflow part 651 at a region on the outside in the radial direction of the end part on the side opposite to the valve body 30 side of the first spring 481 in the outlet pipe structural member 60. The first projection 65 supports the end part on the side opposite to the valve body 30 side of the first spring 481 from the outside in the radial direction of the first spring 481. The axis line CL of the first fluid inflow part 651 matches the axis of the first sleeve 43. The configuration of each of the second and third projections 66 and 67 is substantially the same as that of the first projection 65.

With the configuration, even when vibration or the like from the outside propagates to the valve device 1, an axis deviation of the first to third springs 481, 482, and 483 is suppressed. Therefore, abrasion of the first to third springs 481, 482, and 483 and the first to third sleeves 43, 44, and 45 is suppressed, and leakage of the cooling water is suppressed.

The first to third projections 65, 66, and 67 are inserted in the first to third fluid outlet parts 153, 154, and 155 formed in the housing body 11, respectively. The first to third projections 65, 66, and 67 are formed at positions so as to be in contact with the inner periphery of the first to third fluid outlet parts 153, 154, and 155 formed in the housing body 11. The first to third projections 65, 66, and 67 also function as guides at the time of assembling the housing body 11 and the outlet pipe structural member 60.

Figure 7:
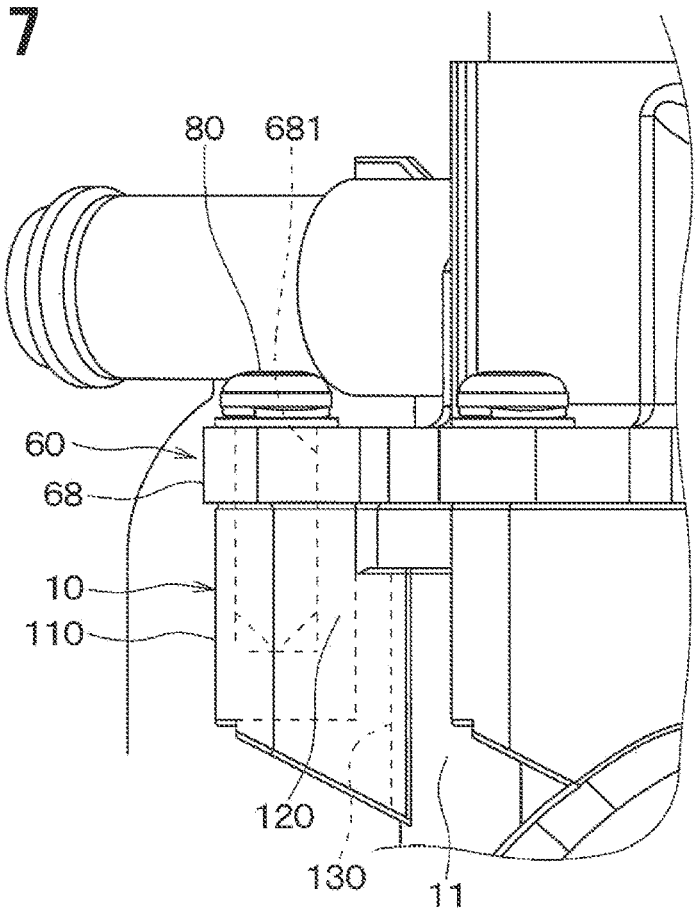
FIG. 7 is a diagram illustrating a state where a housing and an outlet pipe structural member are fastened by a tapping screw.

As illustrated in FIG. 7, in the valve device 1 of the embodiment, the housing 10 and the outlet pipe structural member 60 are fixed by a tapping screw 80 as an example of a screw.

In the outlet pipe structural member 60, a screw fixing part 68 in which a through hole 681 for inserting the tapping screw 80 is made is formed.

The housing 10 includes the housing body 11 having a flow path in which fluid flows, a screw fastening part 110 in which the tapping screw 80 is fastened, and a coupling part 120 coupling the housing body 11 and the screw fastening part 110.

A worker inserts the tapping screw 80 into the through hole 681 formed in the screw fixing part 68 and, after that, fastens and fixes the tapping screw 80 in the screw fastening part 110 in the housing 10. The worker fastens and fixes the tapping screw 80 so that the tapping screw 80 cuts in the screw fastening part 110 in the housing 10. By the operation, the housing 10 and the outlet pipe structural member 60 are integrated.

In the housing 10 of the embodiment, a hole 130 is formed in the coupling part 120 coupling the housing body 11 and the screw fastening part 110. The hole 130 is formed between the screw fastening part 110 and the housing body 11. The hole 130 is formed so as to penetrate the coupling part 120 in the vertical direction.

In the case where the hole 130 is not formed, at the time of fastening and fixing the taping screw 80 into the screw fastening part 110 in the housing 10, when a force to screw in the tapping screw 80 is strong, a crack occurs and the screw fastening part 110 is broken. When such a crack extends, leakage of the cooling water in the housing 10 occurs.

However, in the valve device 1 of the embodiment, the hole 130 is formed in the coupling part 120 coupling the housing body 11 and the screw fastening part 110. Consequently, at the time of fastening and fixing the tapping screw 80 in the screw fastening part 110 in the housing 10, even a crack occurs in the screw fastening part 110, the crack develops along the coupling part 120, stops at the hole 130, and does not extend to the housing body 11 side. Therefore, leakage of the cooling water in the housing 10 is prevented.

As described above, the valve device 1 of the embodiment has a case member configured by the housing 10 and the outlet pipe structural member 60. The case member has the fluid inlet part 24 in which fluid flows, the first to third fluid inflow parts 651, 652, and 653 in which the fluid flowing in from the fluid inlet part 24 flows, and the first to third fluid outflow ports 61, 62, and 63 from which the fluid passed through the first to third fluid inflow parts 651, 652, and 653 outflows. The valve device 1 also includes the valve body 30 having the first to third valve outflow ports 373, 374, and 375 to which the fluid inflowed from the fluid inlet parts flows, and provided rotatably on the inside of the case member. The valve device 1 also includes the first to third cylindrical sleeves 43, 44, and 45 slidably supported by the inner walls of the fluid inflow parts and forming flow paths which guide the fluid outflowed from the first to third valve outflow ports 373, 374, and 375 to the fluid outflow port side of the case member. The valve device 1 also has the first to third springs 481, 482, and 483 placed so as to surround the outer peripheries of the first to third sleeves 43, 44, and 45 and press the first to third sleeves 43, 44, and 45 to the valve body 30 side. The valve device 1 also has a spring end support part at the end part on the side opposite to the valve body 30 side of the first to third springs 481, 482, and 483 in the case member. The spring end support part supports the end part on the side opposite to the valve body 30 side in the axial direction of the first to third springs 481, 482, and 483 from the outside in the radial direction of the first to third springs 481, 482, and 483.

With such a configuration, by the spring end support part formed in the end part on the side opposite to the valve body 30 side of the first to third springs 481, 482, and 483 in the case member, the end part on the side opposite to the valve body 30 side in the axial direction of the first to third springs 481, 482, and 483 is supported. Therefore, an axial deviation of the first to third springs 481, 482, and 483 is prevented without a contact between the first to third springs 481, 482, and 483 and the first to third sleeves 43, 44, and 45. Therefore, abrasion of the first to third springs 481, 482, and 483 and the first to third sleeves 43, 44, and 45 can be suppressed.

The spring end support part has the plurality of first to third projections 65, 66, and 67 projected from the end part on the side opposite to the valve body 30 side in the axial direction of the first to third springs 481, 482, and 483 in the case member toward the valve body 30 side. In such a manner, the spring end support part can be configured by the plurality of first to third projections 65, 66, and 67.

The case member includes the housing 10 having the fluid inlet part 24 and the outlet pipe structural member 60 having the first to third fluid inflow parts 651, 652, and 653 and the first to third fluid outflow ports 61, 62, and 63.

The housing 10 has the first to third fluid outlet parts 153, 154, and 155 guiding the fluid inflowed from the fluid inlet part 24 to the first to third fluid inflow parts 651, 652, and 653.

At the time of assembling the housing 10 and the outlet pipe structural member 60, the plurality of first to third projections 65, 66, and 67 also function as guides to assemble the housing body 11 and the outlet pipe structural member 60.

Therefore, as compared with the case of providing a guide to assemble the housing body 11 and the outlet pipe structural member 60 separately from the first to third projections 65, 66, and 67 as the spring end support part, the size can be reduced.

The outlet pipe structural member 60 has the screw fixing part 68 in which the through hole 681 for inserting the tapping screw 80 is formed.

The housing 10 includes the housing body 11 having a flow path in which the cooling water flows, the screw fastening part 110 in which the tapping screw 80 is fastened, and the coupling part 120 coupling the housing body 11 and the screw fastening part 110.

By fastening and fixing the tapping screw 80 inserted in the through hole 681 formed in the screw fixing part 68 to the screw fastening part 110 formed in the housing 10, the housing body 11 and the outlet pipe structural member 60 are assembled to each other. The hole 130 is formed between the screw fastening part 110 and the housing body 11.

With such a configuration, since the hole 130 is formed between the screw fastening part 110 and the housing body 11, development of a crack to the housing body 11 side can be prevented at the time of fastening and fixing the tapping screw 80 in the screw fastening part 110.

Second Embodiment

A valve device according to a second embodiment will be described with reference to FIG. 8. The valve device 1 of the second embodiment has the outlet pipe structural member 60 having the first pipe connecting part 641. The first pipe connecting part 641 has a first inflow port 6411 in which a cooling water flows and a first flow path 641a in which the cooling water inflowed from the first inflow port 6411 flows. Further, the first pipe connecting part 641 has a second inflow port 6412 in which the cooling water flows and a second flow path 641b in which the cooling water inflowed from the second inflow port 6412 flows. The first pipe connecting part 641 also has a third flow path 641c in which the cooling water obtained by merging the cooling water flowing in the first flow path 641a and the cooling water flowing in the second flow path 641b flows.

After the cooling water flowing in the first flow path 641a and the cooling water flowing in the second flow path 641b merge in the middle, the resultant cooling water flows in the third flow path 641c and flows out from a not-illustrated fluid outflow port. The first flow path 641a and the second flow path 641b are formed so as to extend side by side.

In the first flow path 641a, the second flow path 641b, and the third flow path 641c in the first pipe connecting part 641, a right-angle part which is orthogonal to the flow direction of the cooling water is not provided. That is, in the merging part in which the cooling water flowing in the first flow path 641a and the cooling water flowing in the second flow path 641b merge, the inner wall forming the first to third flow paths 641a, 641b, and 641c of the first pipe connecting part 641 is formed at an angle which is equal to or larger than 90 degrees with respect to the flow direction of the cooling water.

With the configuration, as compared with the case of forming the inner wall forming the first to third flow paths 641a, 641b, and 641c of the first pipe connecting part 641 at the angle of 90 degrees with respect to the flow direction of the cooling water, the passing water resistance can be made lower. In addition, since so-called forced extraction at the time of molding the outlet pipe structural member 60 becomes easier, the process cost of the outlet pipe structural member 60 can be reduced.

As described above, the valve device 1 of the embodiment is provided with the outlet pipe structural member 60 having the first pipe connecting part 641 in which the cooling water as the fluid flows. The first pipe connecting part 641 has the first inflow port 6411 into which the cooling water flows and the first flow path 641a in which the cooling water inflowed from the first inflow port 6411 flows. The first pipe connecting part 641 also has the second inflow port 6412 into which the cooling water flows and the second flow path 641b in which the cooling water inflowed from the second inflow port 6412 flows. The first pipe connecting part 641 also has the third flow path 641c in which the cooling water obtained by merging the cooling water flowing in the first flow path 641a and the cooling water flowing in the second flow path 641b flows.

The cooling water flowing in the first flow path 641a and the cooling water flowing in the second flow path 641b merge in the middle and, after that, the merged cooling water passes through the third flow path 641c, and outflows from the fluid outflow port. In the merge part in which the cooling water flowing in the first flow path 641a and the cooling water flowing in the second flow path 641b merge, the inner wall forming the first to third flow paths 641a, 641b, and 641c of the first pipe connecting part 641 is formed at an angle of 90 degree or more with respect to the flow direction of the cooling water.

With such a configuration, the passing water resistance can be made lower as compared with the case of forming the inner wall forming the first to third flow paths 641a, 641b, and 641c of the first pipe connecting part 641 at 90 degrees with respect to the flow direction of the cooling water.

Third Embodiment

Figure 9:
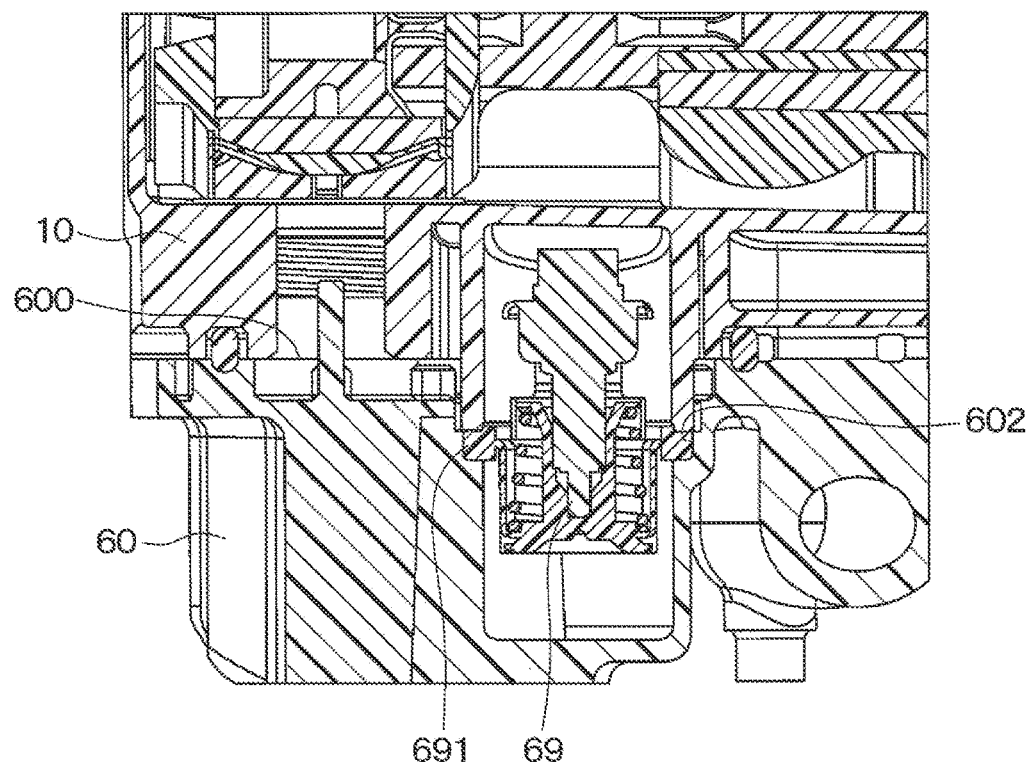
FIG. 9 is a cross section of a valve device according to a third embodiment.

A valve device according to a third embodiment will be described with reference to FIGS. 9 and 10. FIG. 9 is a cross section of the valve device 1 of the third embodiment. In FIG. 9, the valve device 1 is illustrated upside down. That is, the housing 10 is illustrated so as to be on the upper side in the vertical direction with respect to the outlet pipe structural member 60.

The outlet pipe structural member 60 of the embodiment is provided with a relief valve 69 for suppressing overheating of the engine 2 when the electric motor which drives the shaft 31 breaks down.

Figure 8:
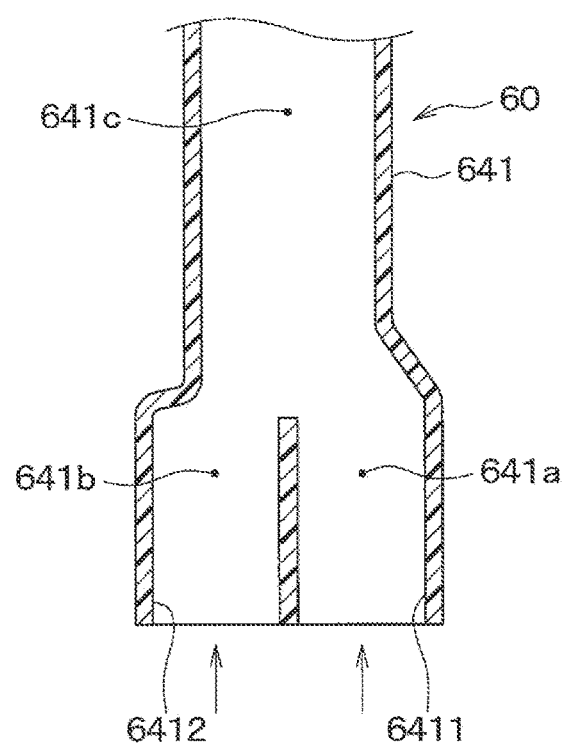
FIG. 8 is a cross section of a first pipe connecting unit of a valve device according to a second embodiment.

The relief valve 69 is placed in the second flow path 641b of the first pipe connecting part 641 illustrated in FIG. 8. The relief valve 69 opens mechanically when the water temperature becomes high to flow the cooling water from the third flow path 641c of the first pipe connecting part 641 to the water jacket 3 of the engine 2.

In the outlet pipe structural member 60 of the embodiment, a joint surface 600 which is joined to the housing 10 and a recessed part 602 formed in a position recessed from the joint surface 600 are formed.

On the other hand, the relief valve 69 has a flange part 691 which is fixed to the outlet pipe structural member 60. The relief valve 69 is press-fitted and fixed in the recessed part 602 formed in the outlet pipe structural member 60.

Next, assembly of the outlet pipe structural member 60 to the housing 10 will be described.

First, the outlet pipe structural member 60 is mounted so that the joint surface 600 to be joined to the housing 10 of the outlet pipe structural member 60 faces upward in the vertical direction.

After that, the flange part 691 of the relief valve 69 is press-fitted and fixed in the recessed part 602 formed in the outlet pipe structural member 60. By the operation, the relieve valve 69 is placed so as to enter a position recessed from the joint surface 600 to be joined to the housing 10 of the outlet pipe structural member 60.

Then, the housing 10 is prepared and placed so as to cover the outlet pipe structural member 60 from the above, and the outlet pipe structural member 60 is screw-fixed to the housing 10.

Figure 10:
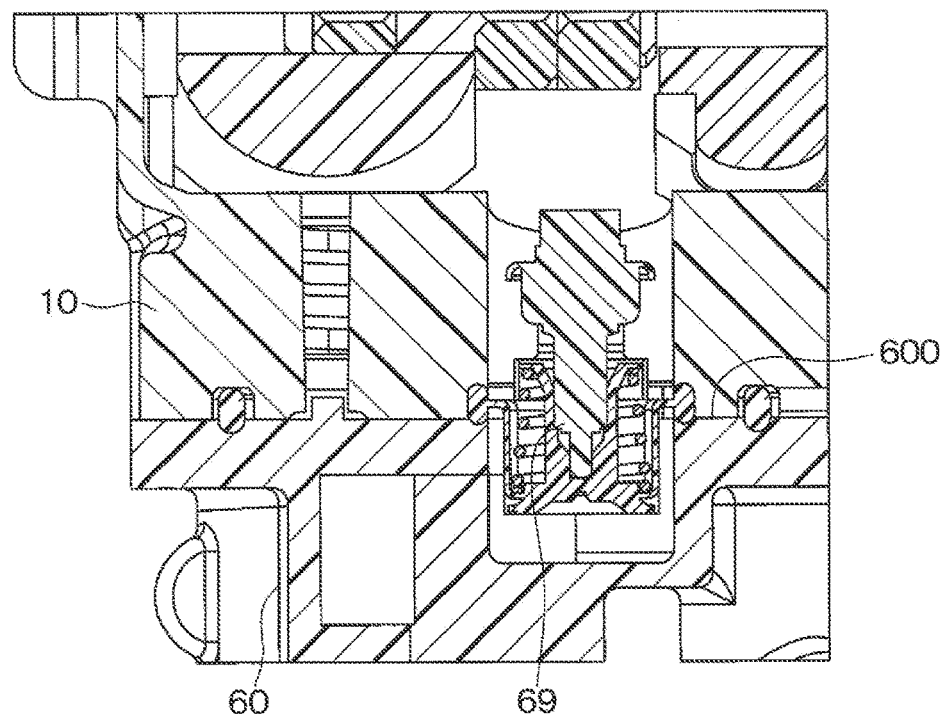
FIG. 10 is a cross section of a conventional valve device.

FIG. 10 is a cross section of a conventional valve device. In the conventional valve device, the relief valve 69 is fixed to the joint surface 600 which is joined to the housing 10 of the outlet pipe structural member 60. Consequently, stability of the relief valve 69 at the time of assembling the outlet pipe structural member 60 to the housing 10 is poor.

As described above, the valve device 1 of the embodiment includes the housing 10 and the outlet pipe structural member 60 having the first pipe connecting part 641 in which cooling water as a fluid flows. The valve device 1 also has the relief valve 69 which is placed in the second flow path 641b of the first pipe connecting part 641 and mechanically opens/closes the second flow path 641b. In the outlet pipe structural member 60, the joint surface 600 which is joined to the housing 10 and the recessed part 602 formed in a position recessed from the joint surface 600 are formed. The relief valve 69 has the flange part 691 which is fixed to the outlet pipe structural member 60. The flange part 691 of the relief valve 69 is fixed in the recessed part 602 formed in the outlet pipe structural member 60.

With such a configuration, since the flange part 691 of the relief valve 69 is fixed in the recessed part 602 formed in the outlet pipe structural member 60, the stability of the relief valve 69 at the time of assembling the outlet pipe structural member 60 to the housing 10 can be improved.

Fourth Embodiment

Figure 11:
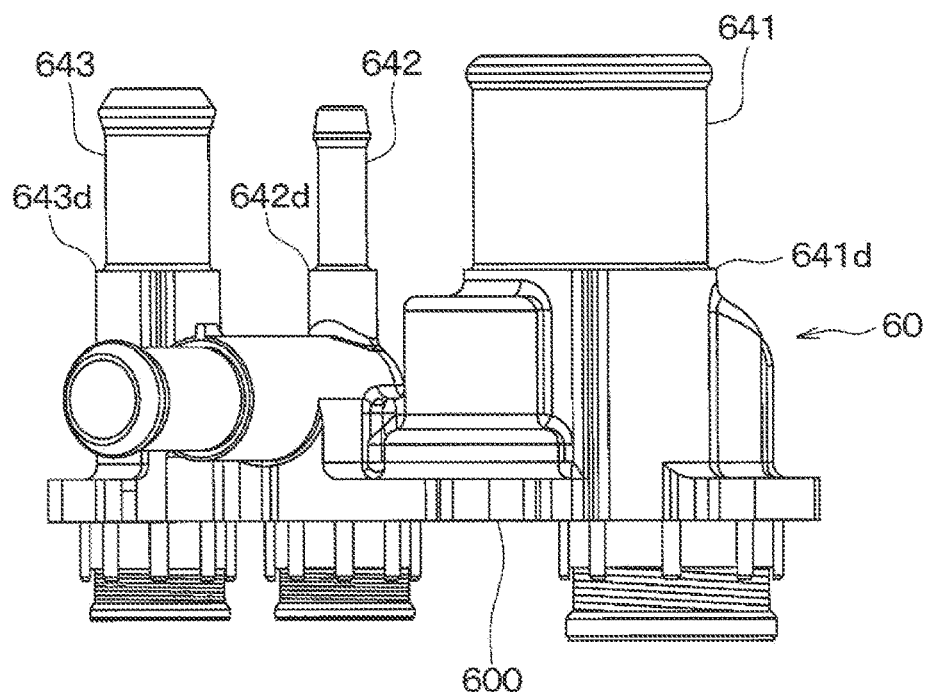
FIG. 11 is a front view of an outlet pipe structural member of a valve device according to a fourth embodiment.

FIG. 11 is a front view of the outlet pipe structural member 60 of a valve device according to a fourth embodiment. In the valve device 1 of the fourth embodiment, the positions of first to third stoppers 641d, 642d, and 643d formed in the first to third pipe connecting parts 641, 642, and 643 are the same. Specifically, the lengths from the joint surface 600 which is joined to the housing 10 of the outlet pipe structural member 60 to the first to third stoppers 641d, 642d, and 643d are the same.

To each of the first to third pipe connecting parts 641, 642, and 643, a not-illustrated hose is connected. The first to third stoppers 641d, 642d, and 643d come into contact with the hoses attached to the first to third pipe connecting parts 641, 642, and 643.

Specifically, at the time of attaching hoses to the first to third pipe connecting parts 641, 642, and 643, the front ends of the hoses come into contact with the first to third stoppers 641d, 642d, and 643d, and the hoses do not further move toward the root side of the first to third pipe connecting parts 641, 642, and 643.

As described above, the valve device 1 of the embodiment has the housing 10 and the outlet pipe structural member 60 in which the first to third pipe connecting parts 641, 642, and 643 are formed. In the outlet pipe structural member 60, the first to third stoppers 641d, 642d, and 643d which come into contact with the front ends of hoses attached to the outlet pipe structural member 60 are formed. The lengths from the joint surface 600 which is joined to the housing 10, of the outlet pipe structural member 60 to the first to third stoppers 641d, 642d, and 643d are the same.

With such a configuration, the operation performance at the time of assembling hoses to the first to third pipe connecting parts 641, 642, and 643 can be improved. In addition, formability can be improved as compared with the case where the positions of the first to third stoppers 641d, 642d, and 643d formed in the first to third pipe connecting parts 641, 642, and 643 are different.

Fifth Embodiment

Figure 12:
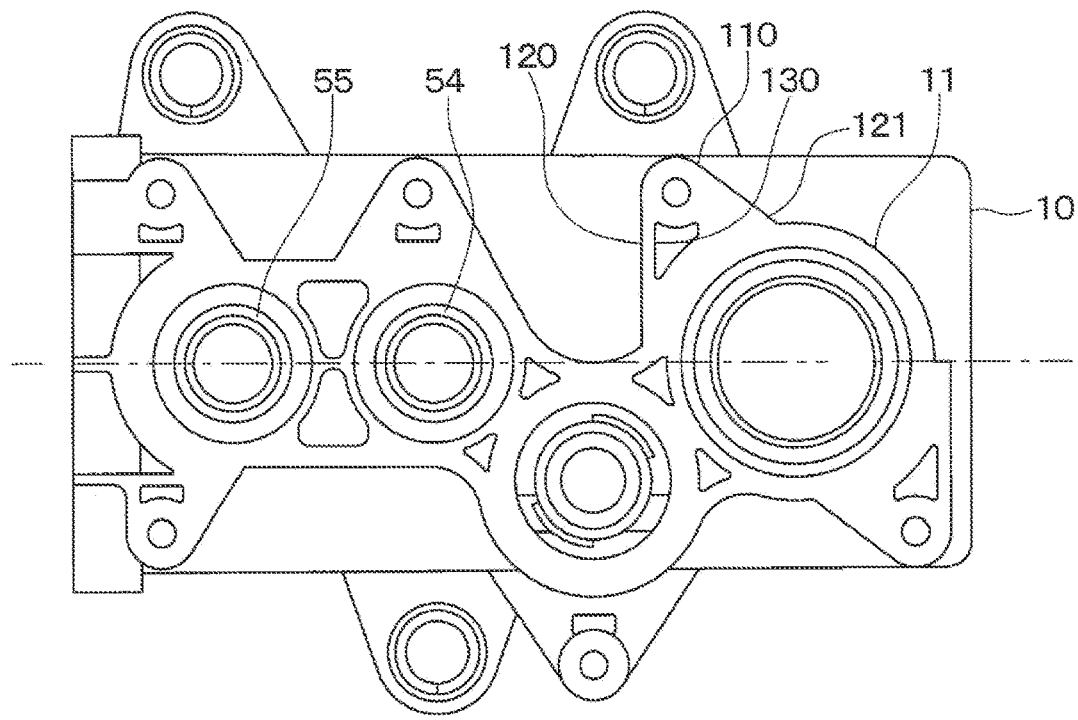
FIG. 12 is a diagram illustrating a housing of the valve device according to the fourth embodiment, and corresponding to FIG. 6.
Figure 13:
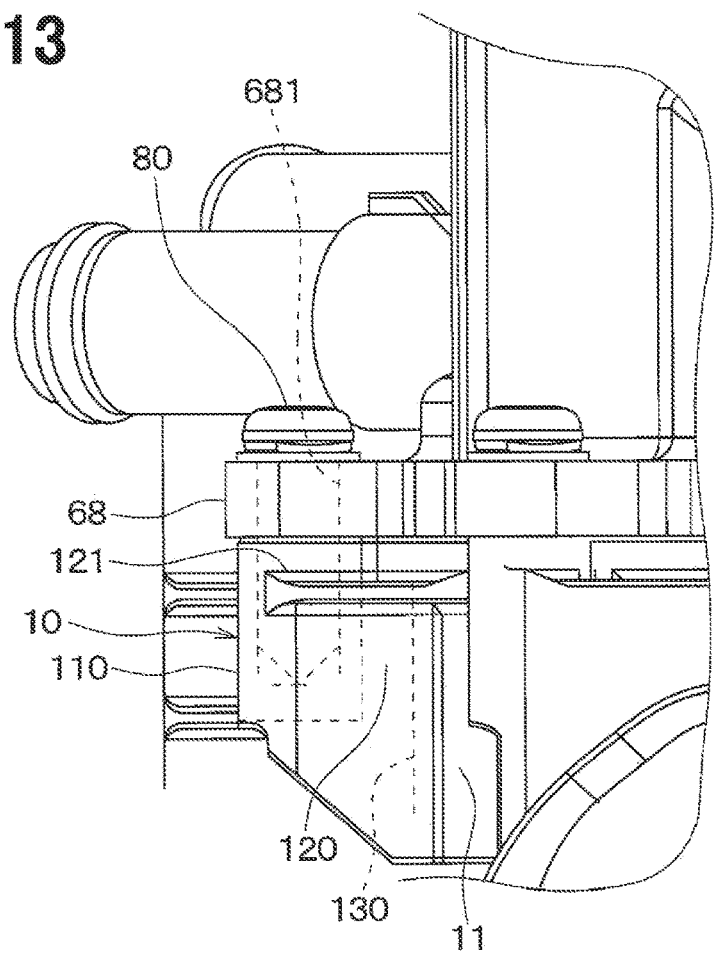
FIG. 13 is a diagram illustrating a state in which a housing and an outlet pipe structural member are fastened by a tapping screw of the valve device according to the fourth embodiment.

A valve device according to a fifth embodiment will be described with reference to FIGS. 12 and 13. The valve device 1 of the fifth embodiment is different from the valve device 1 of the first embodiment with respect to the point that a rib 121 is further provided. The rib 121 is formed so as to expand in a direction perpendicular to the axial direction of the screw hole of the screw fastening part 110.

In the valve device 1 having the rib 121 as described above, the hole 130 may be formed in the coupling part 120 coupling the housing body 11 and the screw fastening part 110.

Other Embodiments (1) Although the spring end support part is configured by the eight projections 65 in the foregoing embodiments, the number of the projections 65 is not limited to eight. A ring-shaped spring end support part may be formed in the end part on the side opposite to the valve body 30 side of the first to third springs 481, 482, and 483 in the outlet pipe structural member 60. By the ring-shaped spring end support part, the end parts on the side opposite to the valve body 30 side of each of the first to third springs 481, 482, and 483 may be supported from the outside in the radial direction of the first to third springs 481, 482, and 483.

(2) The outlet pipe structural member 60 of the first embodiment has the plurality of first to third projections 65, 66, and 67 as the spring end support part. Alternatively, the plurality of first to third projections 65, 66, and 67 as the spring end support part may be provided separately from the outlet pipe structural member 60.

The present disclosure is not limited to the foregoing embodiments but can be properly changed. The embodiments are not unrelated to one another and can be properly combined except for the case where combination is apparently impossible. Obviously, the elements of each of the embodiments are not always necessary except for the case that they are illustrated as essential ones and the case where they are apparently considered to be essential. Each of the embodiments is not limited to a specific number except for the case where the numbers of the elements, numerical values, quantities, and ranges of the embodiments are mentioned, particularly, the case where it is clearly expressed that the numerical values are essential, the case where it is obviously limited to a specific number in principle, and the like. In each of the foregoing embodiments, when material, shape, positional relation, or the like of a component or the like is mentioned, the present disclosure is not limited to the material, shape, positional relation, or the like except for the case where it is clearly expressed, the case where the present disclosure is limited to a specific material shape, positional relation, or the like in principle, and the case.

The housing 10 and the outlet pipe structural member 60 correspond to the case member, and the projections 65 to 67 correspond to the spring end support part.

What is claimed is:

1. A valve device configured to perform at least one of adjustment of a flow rate of fluid or switching of a flow path, the valve device comprising:
   a case member having
   a fluid inlet part configured to cause fluid to flow therethrough,
   a fluid inflow part configured to cause the fluid, which flows into the fluid inlet part, to flow therethrough, and
   a fluid outflow port configured to cause the fluid, which passes through the fluid inflow part, to flow therefrom;
   a valve body having a valve outflow port configured to cause the fluid, which flows from the fluid inlet part, to flow therethrough and is rotational inside the case member;
   a cylindrical sleeve slidably supported by an inner wall of the fluid inflow part and forming a flow path configured to guide the fluid, which flows from the valve outflow port, to the fluid outflow port of the case member;
   a spring surrounding an outer periphery of the sleeve and biasing the sleeve toward the valve body; and
   a spring end support part formed on an end part in the case member, which is on an opposite side of the spring from the valve body, wherein
   the spring end support part is configured to support an end part of the spring on a side opposite to the valve body in an axial direction and from an outside in a radial direction of the spring, wherein the spring end support part includes a plurality of projections projecting from the end part in the case member, which is on the opposite side of the spring from the valve body in the axial direction, toward the valve body, and the plurality of projections is located on an outside of the spring in a radial direction and surrounds an outer circumferential periphery of the spring, and the plurality of projections overlaps in position with the spring in an axial direction of the spring.

2. The valve device according to claim 1, wherein
the case member includes a housing having the fluid inlet part and an outlet pipe structural member having the fluid inflow part and the fluid outflow port,
the housing has a fluid outlet part configured to guide the fluid, which flows from the fluid inlet part to the fluid inflow part, and
the plurality of projections is configured to guide the sleeve and the spring to an inside of the fluid outlet part when the housing and the outlet pipe structural member are assembled to each other.

3. The valve device according to claim 2, wherein
the outlet pipe structural member has a screw fixing part having a through hole configured to be inserted with a screw,
the housing includes a housing body having a flow path to cause the fluid to flow therethrough, a screw fastening part in which the screw is fastened, and a coupling part via which the housing body and the screw fastening part are coupled to each other,
the housing body and the outlet pipe structural member are assembled to each other by fastening and fixing the screw inserted in the through hole formed in the screw fixing part to the screw fastening part formed in the housing, and a hole is formed between the screw fastening part and the housing body.

4. The valve device according to claim 2, wherein
the plurality of projections is inserted in the fluid outlet part.

5. The valve device according to claim 4, wherein
the plurality of projections is formed at positions to be in contact with an inner periphery of the fluid outlet part.

6. The valve device according to claim 1, wherein
the plurality of projections projects in parallel to an axis line of the fluid inflow part at a region, which is on an outside of the spring in the radial direction, from the end part in the case member, which is on the opposite side of the spring from the valve body in the axial direction.

7. The valve device according to claim 1, wherein
the plurality of projections is located on the outside of an end part of the spring, which is on a side opposite to the valve body, in the radial direction and surrounds the outer circumferential periphery of the end part of the spring.

8. The valve device according to claim 7, wherein
the plurality of projections is configured to be in contact with the outer circumferential periphery of the end part of the spring.

9. The valve device according to claim 7, wherein
the plurality of projections is configured to support the end part of the spring from the outside of the spring in the radial direction.

10. The valve device according to claim 1, wherein
the plurality of projections is separated from each other in a circumferential direction.

11. The valve device according to claim 1, wherein
the plurality of projections includes eight projections.

* * * * *